(12) United States Patent
Ashok et al.

(10) Patent No.: US 9,245,131 B2
(45) Date of Patent: *Jan. 26, 2016

(54) MULTI-USER UNIVERSAL SERIAL BUS (USB) KEY WITH CUSTOMIZABLE FILE SHARING PERMISSIONS

(71) Applicant: International Business Machines Corporation, Armonk, NY (US)

(72) Inventors: Rohith K. Ashok, Apex, NC (US); Roy F. Brabson, Raleigh, NC (US); Hugh E. Hockett, Raleigh, NC (US); Andrew R. Low, Stittsville (CA)

(73) Assignee: International Business Machines Corporation, Armonk, NY (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/854,213

(22) Filed: Apr. 1, 2013

(65) Prior Publication Data

US 2014/0298489 A1    Oct. 2, 2014

Related U.S. Application Data

(63) Continuation of application No. 13/853,491, filed on Mar. 29, 2013.

(51) Int. Cl.
*G06F 15/16* (2006.01)
*G06F 17/30* (2006.01)
(Continued)

(52) U.S. Cl.
CPC ............... *G06F 21/60* (2013.01); *G06F 21/31* (2013.01)

(58) Field of Classification Search
CPC ....... H04L 63/102; G06F 21/10; G06F 21/31; G06F 21/6218; G06F 2221/2141

USPC .......................................... 726/2–21, 26–33
See application file for complete search history.

(56) References Cited

U.S. PATENT DOCUMENTS 6,636,929 B1   10/2003   Frantz et al.
6,957,179 B2   10/2005   Debling
(Continued)

FOREIGN PATENT DOCUMENTS

CN   2824442 Y   10/2006
CN   102542200 A   7/2012
(Continued)

OTHER PUBLICATIONS

Office Action for U.S. Appl. No. 13/854,200 dated Feb. 4, 2014, pp. 1-14.
(Continued)

*Primary Examiner* — Evans Desrosiers
(74) *Attorney, Agent, or Firm* — Robert A. Voigt, Jr.; Winstead, P.C.

(57) ABSTRACT

A method, data storage device and computer program product for having multiple users share a single data storage device securely. A data storage device, such as a Universal Serial Bus (USB) key, is plugged into a computing device. A USB controller of the USB key recognizes the computing device and creates an account for the user. The created account is associated with the user as well as associated with the computing device. Data uploaded to the USB key by the user is then associated with the created account. Only that user will be able to view that data on his/her computing device (computing device associated with the created account) unless the user indicates to share that data with other users. Such a process may be repeated each time the USB key is plugged into a different computing device thereby creating multiple accounts associated with multiple computing devices and users.

8 Claims, 5 Drawing Sheets

(51) Int. Cl.
*H04L 29/06* (2006.01)
*G06F 21/60* (2013.01)
*G06F 21/31* (2013.01)
*G06F 1/00* (2006.01)
*H04N 7/167* (2011.01)

(56) References Cited

U.S. PATENT DOCUMENTS

| | | | |
|---|---|---|---|
| 7,383,547 | B1 | 6/2008 | Miri |
| 7,418,377 | B2 | 8/2008 | Poley et al. |
| 7,418,524 | B2 | 8/2008 | Beasley et al. |
| 7,555,570 | B2 | 6/2009 | Hickey et al. |
| 7,702,830 | B2 | 4/2010 | Brunet et al. |
| 7,715,834 | B2 | 5/2010 | Hibino |
| 7,813,913 | B2 | 10/2010 | Collins et al. |
| 7,844,445 | B2 | 11/2010 | Brunet et al. |
| 7,844,749 | B2 | 11/2010 | Tredoux et al. |
| 7,899,662 | B2 | 3/2011 | Brunet et al. |
| 8,001,303 | B2 | 8/2011 | Brundridge et al. |
| 8,219,653 | B1 | 7/2012 | Keagy et al. |
| 8,661,281 | B2 | 2/2014 | Chang et al. |
| 2005/0080973 | A1 | 4/2005 | Lee |
| 2005/0209842 | A1 | 9/2005 | Klein |
| 2005/0240712 | A1 | 10/2005 | Klein |
| 2007/0162271 | A1 | 7/2007 | Brunet et al. |
| 2007/0168481 | A1 | 7/2007 | Lambert et al. |
| 2007/0186277 | A1 | 8/2007 | Loesch et al. |
| 2007/0225962 | A1 | 9/2007 | Brunet et al. |
| 2008/0082813 | A1 | 4/2008 | Chow et al. |
| 2008/0098172 | A1* | 4/2008 | Tsang ............... G06F 21/554 711/115 |
| 2008/0181412 | A1 | 7/2008 | Acar et al. |
| 2008/0189095 | A1 | 8/2008 | Chen et al. |
| 2008/0195790 | A1 | 8/2008 | Self |
| 2009/0055514 | A1 | 2/2009 | Tebbs et al. |
| 2009/0089460 | A1* | 4/2009 | Komoda ............ G06F 12/1458 710/13 |
| 2009/0144469 | A1 | 6/2009 | Brundridge et al. |
| 2009/0300151 | A1 | 12/2009 | Friedman et al. |
| 2010/0011358 | A1 | 1/2010 | Kettler et al. |
| 2011/0047128 | A1 | 2/2011 | Brunet et al. |
| 2012/0131331 | A1 | 5/2012 | Benson |
| 2013/0060929 | A1 | 3/2013 | Koponen et al. |

FOREIGN PATENT DOCUMENTS

| | | |
|---|---|---|
| KR | 20110105447 A | 9/2011 |
| WO | 2012111018 A1 | 8/2012 |

OTHER PUBLICATIONS

Office Action for U.S. Appl. No. 13/853,250 dated May 6, 2014, pp. 1-30.

Blair et al., "Method to Identify Multiple Identical USB Devices," IPCOM000123624D, Feb. 1, 1999, pp. 1-3.

Anonymously, "Method for Emulating a Remote Gaming DMA," IPCOM000135374D, Apr. 11, 2006, pp. 1-6.

Liao et al., "Sharing Virtual USB Device in Virtualized Desktop," 2011 Fourth International Symposium on Parallel Architectures, Algorithms and Programming, IEEE Computer Society, 2011, pp. 156-160.

"PC as USB Device Emulator," http://www.microchip.com/forums/m407943-print.aspx, 2012, pp. 1-7.

Office Action for U.S. Appl. No. 13/853,323 dated Jun. 5, 2014, pp. 1-10.

Office Action for U.S. Appl. No. 13/854,200 dated Jun. 4, 2014, pp. 1-10.

Mell et al., "The NIST Definition of Cloud Computing," Special Publication 800-145, Sep. 2011.

U.S. Patent Application entitled "Emulating Multiple Universal Serial Bus (USB) Keys so as to Efficiently Configure Different Types of Hardware" filed on Mar. 29, 2013.

U.S. Patent Application entitled "A Universal Serial Bus (USB) Key Functioning as Multiple USB Keys so as to Efficiently Configure Different Types of Hardware" filed on Mar. 29, 2013.

Office Action for U.S. Appl. No. 13/853,323 dated Jan. 30, 2014, pp. 1-15.

Office Action for U.S. Appl. No. 13/853,491 dated Sep. 22, 2014, pp. 1-30.

Office Action for U.S. Appl. No. 13/853,250 dated Oct. 22, 2014, pp. 1-38.

Office Action for U.S. Appl. No. 13/854,200 dated Dec. 18, 2014, pp. 1-42.

Office Action for U.S. Appl. No. 13/853,323 dated Dec. 18, 2014, pp. 1-43.

Office Action for U.S. Appl. No. 13/853,491 dated Feb. 19, 2015, pp. 1-29.

* cited by examiner

MULTI-USER UNIVERSAL SERIAL BUS (USB) KEY WITH CUSTOMIZABLE FILE SHARING PERMISSIONS

CROSS-REFERENCE TO RELATED APPLICATIONS

The present application is a continuation application of pending U.S. patent application Ser. No. 13/853,491, which was filed on Mar. 29, 2013, which is assigned to the assignee of the present invention. The present application claims priority benefits to U.S. patent application Ser. No. 13/853,491.

TECHNICAL FIELD

The present invention relates generally to data storage devices, and more particularly to a multi-user Universal Serial Bus (USB) key with customizable file sharing permissions.

BACKGROUND

Data storage devices, such as a Universal Serial Bus (USB) flash drive (also referred to as a "USB key"), are becoming increasingly popular devices for storing, backing-up and transferring computer files. Currently, all the information on the USB key can be made available to any user upon providing the appropriate authentication, such as a password. As a result, multiple users cannot each securely store information on the same USB key with different authentication parameters (e.g., passwords). Furthermore, multiple users cannot securely store information on the same USB key that may be available to other designated users. For example, if user #1 desires to securely store information that may be made available to user #2 and user #3 and if user #4 desires to securely store information that may be made available to user #5 and user #6, then user #1 and user #4 would need to use their own USB keys.

Consequently, multiple users cannot currently share a single USB key securely whereby each user has their files uploaded to the USB key that will be securely available to that particular user and to other users designated by the user if the user so chooses. By not being able to allow multiple users to share a USB key securely, the usefulness of the USB key is lessened.

BRIEF SUMMARY

In one embodiment of the present invention, a method for having multiple users share a single data storage device securely comprises recognizing a first computing device in response to plugging the data storage device into the first computing device. The method further comprises creating a first account on the data storage device for a first user, where the first account is associated with the first user and the first computing device. Additionally, the method comprises receiving, by a controller, data from the first user to be associated with the first account. Furthermore, the method comprises recognizing a second computing device in response to plugging the data storage device into the second computing device. The method further comprises creating a second account on the data storage device for a second user, where the second account is associated with the second user and the second computing device. In addition, the method comprises receiving, by the controller, data from the second user to be associated with the second account. The first user has access to data associated with the first account in response to plugging the data storage device into the first computing device and the second user has access to data associated with the second account in response to plugging the data storage device into the second computing device.

Other forms of the embodiment of the method described above are in a data storage device and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, data storage device and computer program product for having multiple users share a single data storage device securely. In one embodiment of the present invention, a data storage device, such as a Universal Serial Bus (USB) key, is plugged into a computing device. The USB controller of the USB key recognizes the computing device and creates an account (also referred to herein as the "USB virtual key") for the user. The created account is associated with the user as well as associated with the computing device. The USB controller may then receive data, such as computer files, uploaded by the user of the USB key which is then associated with the created account. Only that user will be able to view that data on his/her computing device (computing device associated with the created account that is associated with the data to be viewed) unless the user indicates to share that data with other users. Such a process may be repeated each time the USB key is plugged into a different computing device thereby creating multiple accounts associated with multiple computing devices and users. In this manner, a single USB key may be used among multiple users securely.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
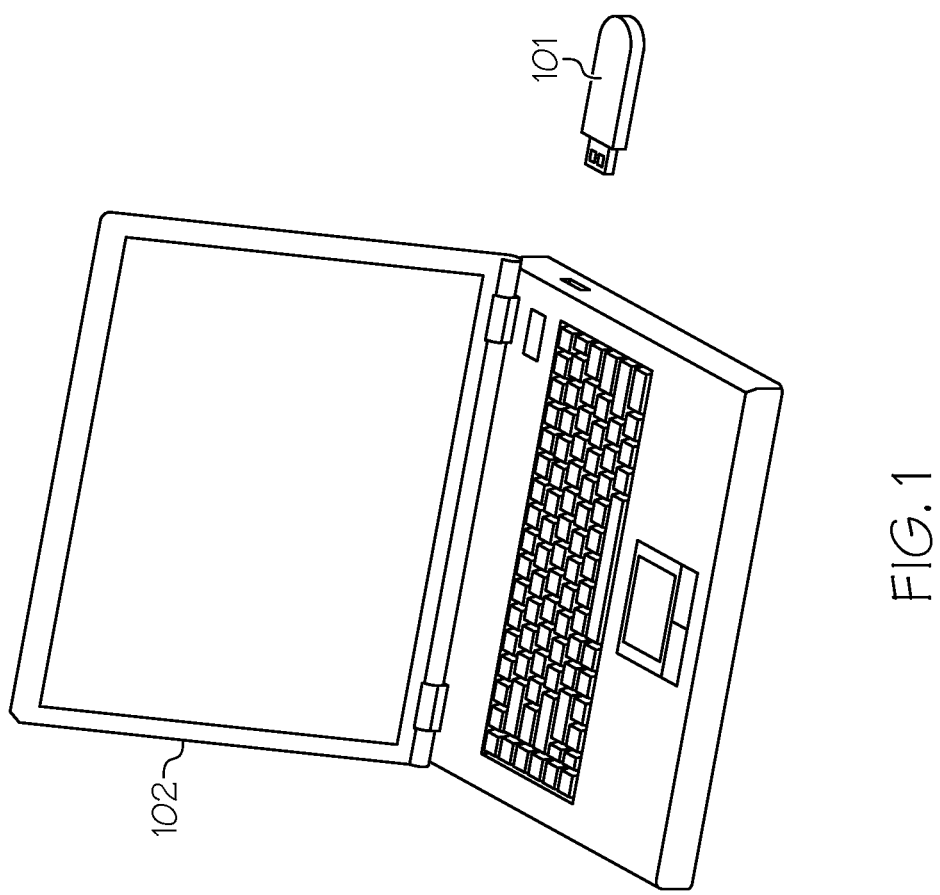
FIG. 1 illustrates a data storage device that can be attached to or detached from a computing device in accordance with an embodiment of the present invention.

Referring now to the Figures in detail, FIG. 1 illustrates a data storage device 101 that can be attached to or detached from a computing device 102 in accordance with an embodiment of the present invention. In one embodiment, data storage device 101, such as a Universal Serial Bus (USB) key, includes a flash memory with an integrated USB interface as discussed further detail below in connection with FIG. 2. In one embodiment, computing device 102 is configured to write to and read data from data storage device 101 when data storage device 101 is connected thereto. While FIG. 1 illustrates computing device 102 as a laptop computer, computing device 102 may be any computing device configured with the capability of connecting to data storage device 101, such as via a USB port or a USB adapter.

As stated in the Background section, data storage devices, such as a Universal Serial Bus (USB) flash drive (also referred to as a "USB key"), are becoming increasingly popular devices for storing, backing-up and transferring computer files. Currently, all the information on the USB key can be made available to any user upon providing the appropriate authentication, such as a password. As a result, multiple users cannot each securely store information on the same USB key with different authentication parameters (e.g., passwords). Furthermore, multiple users cannot securely store information on the same USB key that may be available to other designated users. For example, if user #1 desires to securely store information that may be made available to user #2 and user #3 and if user #4 desires to securely store information that may be made available to user #5 and user #6, then user #1 and user #4 would need to use their own USB keys. Consequently, multiple users cannot currently share a single USB key securely whereby each user has their files uploaded to the USB key that will be securely available to that particular user and to other users designated by the user if the user so chooses. By not being able to allow multiple users to share a USB key securely, the usefulness of the USB key is lessened.

Figure 2:
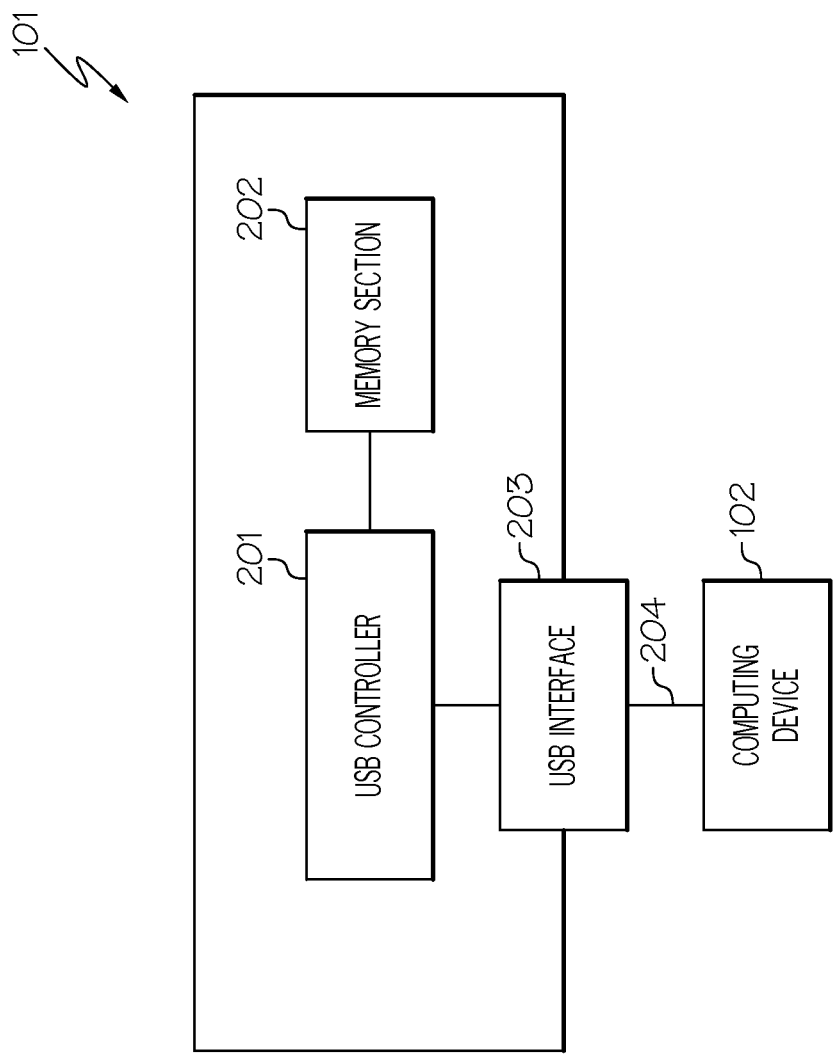
FIG. 2 illustrates a USB key enabling multiple users to share the USB key securely in accordance with an embodiment of the present invention.
Figure 3:
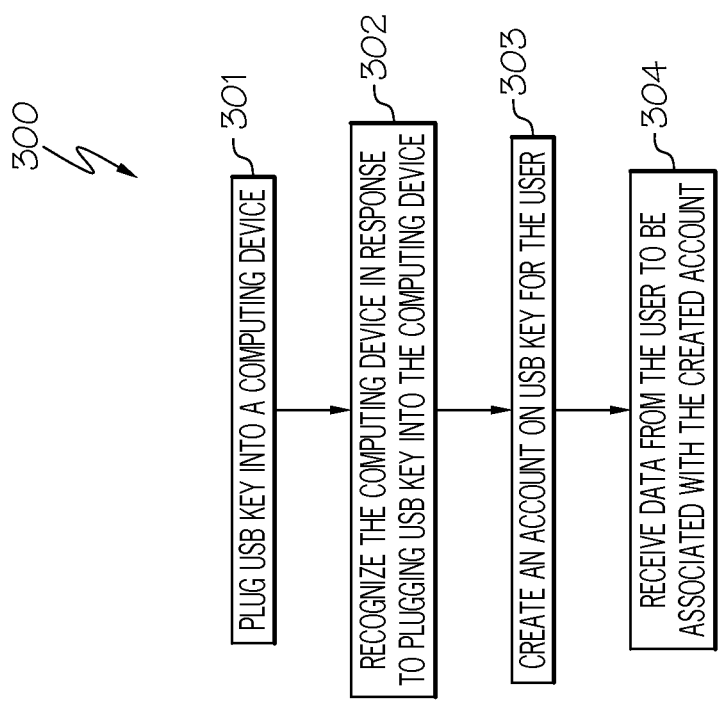
FIG. 3 is a flowchart of a method for having multiple users share a single USB key securely in accordance with an embodiment of the present invention.
Figure 4:
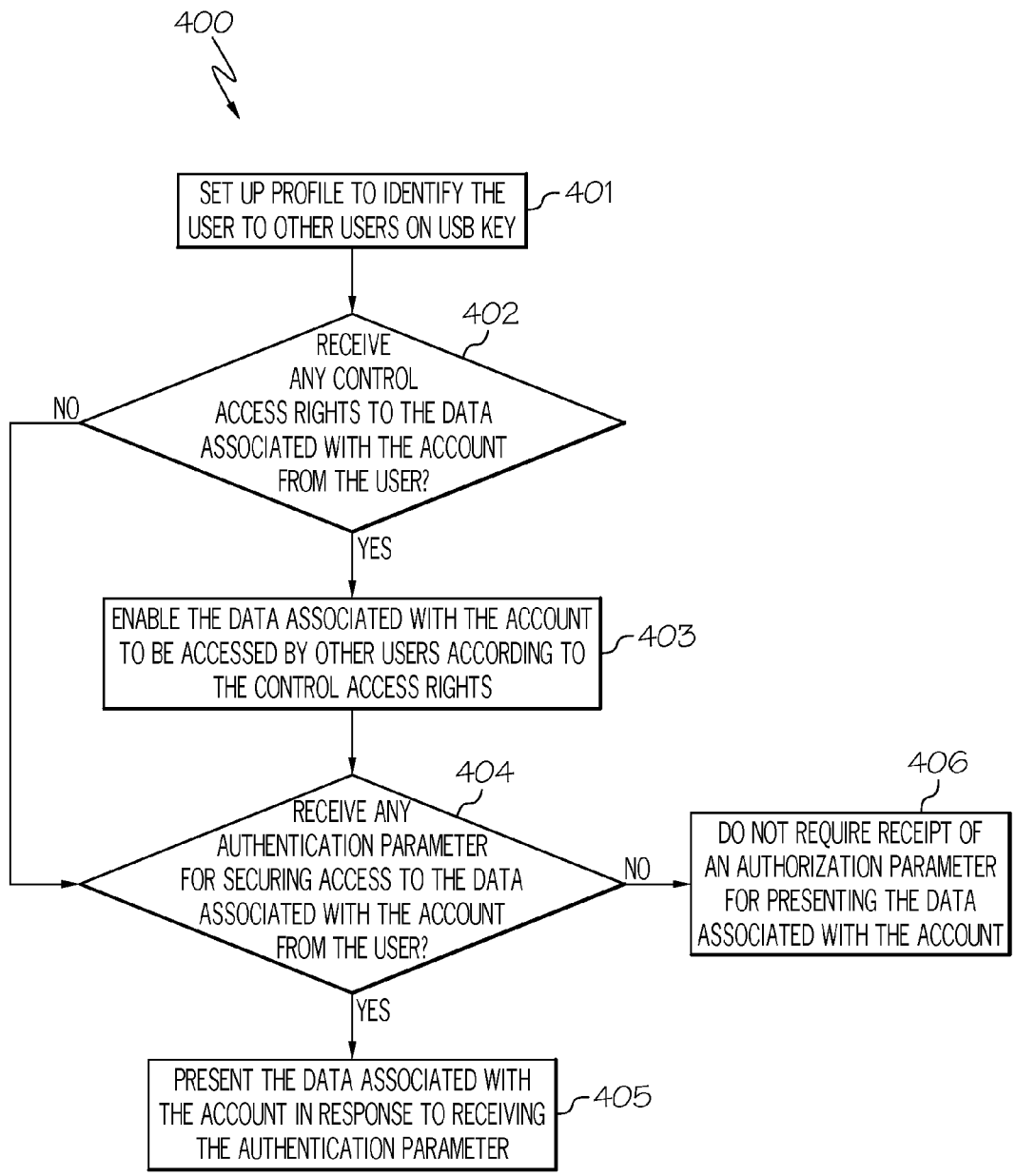
FIG. 4 is a flowchart of a method for configuring the account on the USB key established when the USB key is plugged into the computing device in accordance with an embodiment of the present invention.
Figure 5:
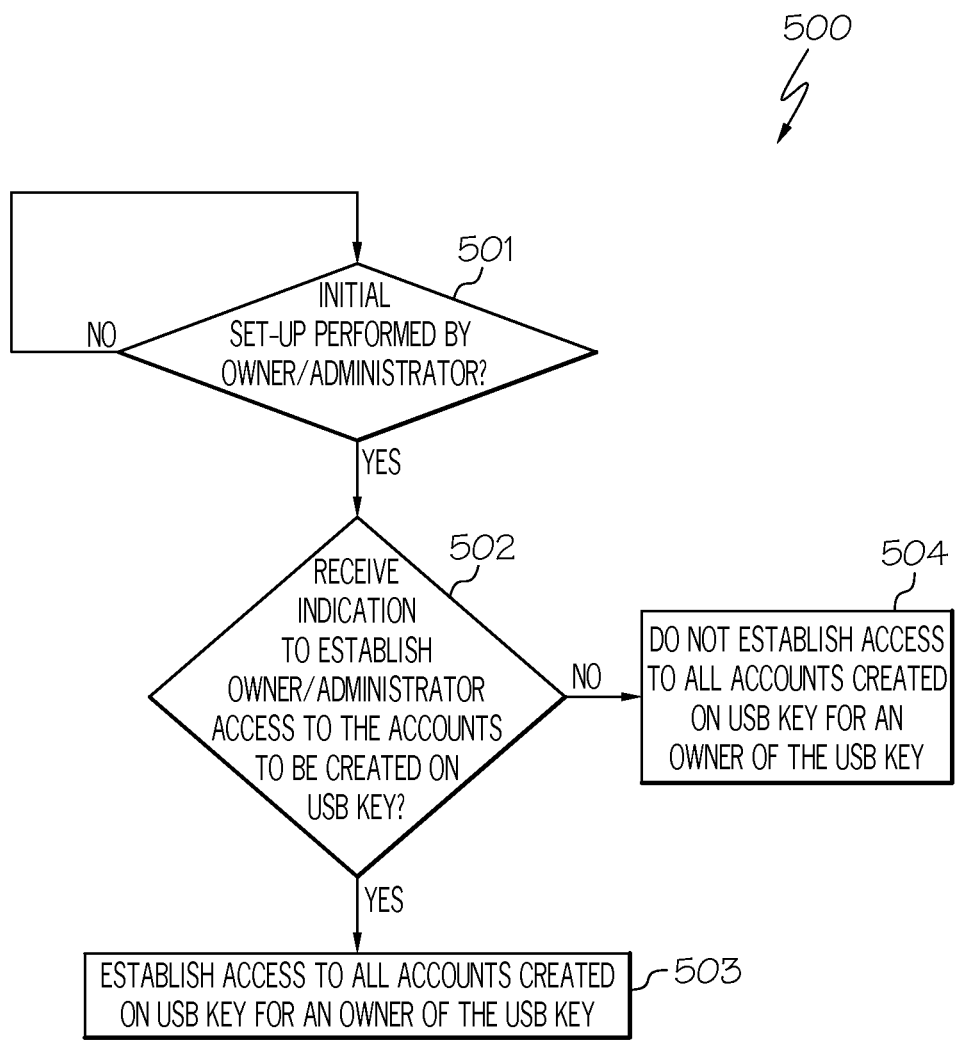
FIG. 5 is a flowchart of a method for setting up owner/administrator access to the USB key in accordance with an embodiment of the present invention.

The principles of the present invention provide a means for enabling a data storage device, such as a USB key, to be shared among multiple users securely thereby increasing the usefulness of the USB key as discussed below in connection with FIGS. 2-5. FIG. 2 illustrates a USB key enabling multiple users to share the USB key securely. FIG. 3 is a flowchart of a method for having multiple users share a single USB key securely. FIG. 4 is a flowchart of a method for configuring the account on the USB key established when the USB key is plugged into a computing device. FIG. 5 is a flowchart of a method for setting up owner/administrator access to the USB key.

Referring now to FIG. 2, FIG. 2 illustrates Universal Serial Bus (USB) key 101 (FIG. 1) that enables multiple users to share USB key 101 securely in accordance with an embodiment of the present invention. In one embodiment, USB key 101 includes a USB controller 201 connected to a memory section 202 which is a non-volatile semiconductor memory, such as a flash memory. In one embodiment, USB controller 201 is configured to control the communication between USB key 101 and a computing device 102 via a USB interface 203, including establishment of the USB communication (e.g., USB 2.0, USB 3.0) and transmission of various data to computing device 102 via USB connection 204 as discussed below. Furthermore, USB key 101 includes the capability of enabling USB key 101 to be shared among multiple users securely as discussed further below.

In one embodiment, memory section 202 is configured to store a program(s) for allowing multiple users to share USB key 101 securely among each other, as discussed herein in connection with FIGS. 3-5, and USB controller 201 is configured to execute the instructions of said program.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As discussed above, USB key 101 can be shared among multiple users securely as discussed in connection with FIG. 3.

FIG. 3 is a flowchart of a method 300 for having multiple users share a single USB key 101 (FIGS. 1 and 2) securely in accordance with an embodiment of the present invention.

Referring to FIG. 3, in conjunction with FIGS. 1-2, in step 301, USB key 101 is plugged into computing device 102.

In step 302, USB controller 201 recognizes computing device 102 in response to plugging USB key 101 into computing device 102. In one embodiment, USB controller 201 recognizes the type of computing device 102 based on the properties (e.g., name, type, serial number) of computing device 102 available on USB interface 203 using the USB plug and play capabilities.

In step 303, USB controller 201 creates an account (also referred to herein as the "USB virtual key") on USB key 101 for the user. In one embodiment, the created account is associated with the user as well as associated with computing device 102. As a result, the information stored on USB key 101 that is associated with the created account (discussed below) will only be accessible by the user associated with the created account when the user plugs USB key 101 into the associated computing device 102.

In step 304, USB controller 201 receives data (e.g., receives data, such as computer files, uploaded by the user of USB key 101) from the user to be associated with the created account.

The process of method 300 can be repeated each time USB key 101 is plugged into a different computing device 102 thereby allowing multiple users to share USB key 101 in a secure manner. For example, when USB key 101 is inserted in computing device 102, USB controller 201 recognizes the type of computing device 102 and creates an account or virtual USB key for the user that is associated with that computing device 102. From the perspective of the user, USB key 101 appears to be empty (i.e., does not contain any data, such as computer files) except for a configuration program associated with the created account as discussed further below. The user may upload data into USB key 101 that will be associated with the created account. Only that user will be able to view that data on his/her computing device 102 (computing device 102 associated with the created account that is associated with the data to be viewed) unless the user indicates to share that data with other users by configuring the account via the configuration program as discussed further below. When USB key 101 is removed from this computing device 102 and plugged into another computing device 102, such as by another user, USB controller 201 recognizes the type of computing device 102 and creates a new account for that user to be associated with that computing device 102. Similarly, that user may upload data into USB key 101 that will be associated with this created account. Furthermore, only that user will be able to view that data on his/her computing device 102 (computing device 102 associated with the created account that is associated with the data to be viewed) unless the user indicates to share that data with other users by configuring the account via the configuration program as discussed further below. In this manner, by creating multiple accounts associated with multiple computing devices 102 and users, a single USB key 101 may be used among multiple users securely.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

As discussed above, the created account or virtual USB key may be associated with a configuration application allowing the user to configure the account, such as to indicate which other user(s) may have access to the user's data stored in USB key 101. A method for configuring the created account ("virtual USB key") on USB key 101 is discussed below in connection with FIG. 4.

FIG. 4 is a flowchart of a method 400 for configuring the account on USB key 101 established when USB key 101 is plugged into computing device 102 in accordance with an embodiment of the present invention.

Referring to FIG. 4, in conjunction with FIGS. 1-2, in step 401, USB controller 201 sets-up a profile to identify the user to other users on USB key 101. In one embodiment, the profile is associated with a username. In such an embodiment, if the user does not provide a username, USB controller 201 is configured to automatically provide a username based on the properties (e.g., name, type, serial number) of computing device 102 (computing device 102 attached to USB key 101).

In step 402, a determination is made by USB controller 201 as to whether it received any control access rights (e.g., creating, reading, writing and deleting permissions) to the data (e.g., files, folders) associated with the account from the user.

If USB controller 201 receives control access rights to the data associated with the account from the user, then, in step 403, USB controller 201 enables the data associated with the account to be accessed by other users according to the control access rights. For example, the user may select a file(s)/folder (s) and select one or more others users to be able to access the selected file(s)/folder(s) according to the designated control access rights. In one embodiment, when another user who has permission to view the shared resource uses USB key 101 on his/her computing device 102, the user may see an additional folder displayed on computing device 102 containing the shared resources, where such a folder includes an identification of the user who uploaded the shared resources (i.e., such a folder includes an identification of the user that granted permission to view the shared resources).

If, however, USB controller 201 does not receive control access rights to the data associated with the account from the user or upon enabling the data associated with the account to be accessed by other users according to the control access rights, then, in step 404, a determination is made by USB controller 201 as to whether it received any authentication parameter (e.g., password, biometric authentication, such as a fingerprint) for securing access to the data associated with the account from the user.

If USB controller 201 receives an authentication parameter for securing access to the data associated with the account from the user, then, in step 405, USB controller 201 presents the data associated with the account in response to receiving the authentication parameter. For example, if USB key 101 is plugged into another computing device 102, the authentication parameter, such as a password or fingerprint scan, may be required to be received by USB controller 201 in order for USB controller 201 to unlock the data (e.g., computer files) so as to be available to be viewed by the user.

If, however, USB controller 201 does not receive an authentication parameter for securing access to the data associated with the account from the user, then, in step 406, USB controller 201 does not require receipt of an authorization parameter for presenting the data associated with the account.

The principles of the present invention are not to be limited in scope to the configurations discussed above, but instead, the principles of the present invention include any type of configuration that would improve ease of use, functionality and security of the account ("virtual USB key") and USB key 101. For example, the user may be able to link multiple accounts that were created based on plugging USB key 101 in multiple computing devices 102, where the user is the owner/main user of those computing devices 102. In another example, USB key 101 may be configured to grant owner/administrator access to all the accounts created on USB key 101 as discussed below in connection with FIG. 5.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

As discussed above, FIG. 5 is a flowchart of a method 500 for setting up owner/administrator access to USB key 101 (FIGS. 1 and 2) in accordance with an embodiment of the present invention.

Referring to FIG. 5, in conjunction with FIGS. 1-2, in step 501, a determination is made by USB controller 201 as to whether an initial set-up is to be performed by the owner/administrator of USB key 101. In one embodiment, the owner/administrator of USB key 101 may establish access to all the accounts ("virtual USB keys"), including the data associated with these accounts. In one embodiment, the owner/administrator may only establish such access if USB key 101 does not contain any data uploaded from a user. That is, the owner/administrator may only establish such access prior to a user uploading data on USB key 101. As a result, the owner/administrator may only establish such access during an initial set-up.

If an initial set-up is not be to be performed by the owner/administrator, then USB controller 201 continues to determine whether an initial set-up is to be performed by the owner/administrator of USB key 101 in step 501.

If, however, an initial set-up is to be performed, a determination is made in step 502 by USB controller 201 as to whether the owner/administrator indicates to establish owner/administrator access to the accounts to be created on USB key 101.

If USB controller 201 receives an indication to establish owner/administrator access to the accounts to be created on USB key 101, then, in step 503, USB controller 201 establishes access to all accounts created on USB key 101 for the owner/administrator. In one embodiment, once the owner/administrator establishes owner/administrator access to the accounts to be created on USB key 101, the owner/administrator may grant other users full access to all the accounts created on USB key 101. In one embodiment, when an owner/administrator has established owner/administrator access to all accounts on USB key 101, the other users are notified, such as via the configuration application associated with the account or via the display of an owner/administrator file on the user's computing device 102, that an owner/administrator will have access to the user's uploaded data. An illustrative use case for an owner to have access to all the accounts on USB key 101 where each other user of USB key 101 only has access to his/her data uploaded to USB key 101 would be where an owner solicits data, such as a vote, on an issue from each user gathered together in a meeting. After each user has uploaded their vote on USB key 101, the user could pass USB key 101 to the next user in the meeting room to add their vote and so forth. After each user in the meeting has inputted their vote, the owner could then tally the vote without the other users (non-owners) being able to view the votes of the other users.

If, however, USB controller 201 does not receive an indication to establish owner/administrator access to the accounts to be created on USB key 101, then, in step 504, USB controller 201 does not establish access to all accounts created on USB key 101 for the owner/administrator.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for having multiple users share a single data storage device securely, the method comprising:
   recognizing a first computing device in response to plugging said data storage device into said first computing device;
   creating a first account on said data storage device for a first user, wherein said first account is associated with said first user and said first computing device;
   receiving, by a controller, data from said first user to be associated with said first account;
   recognizing a second computing device in response to plugging said data storage device into said second computing device;
   creating a second account on said data storage device for a second user, wherein said second account is associated with said second user and said second computing device;
   receiving, by said controller, data from said second user to be associated with said second account;
   receiving an authentication parameter for securing access to said data associated with said first account from said first user; and
   presenting said data associated with said first account in response to receiving said authentication parameter;
   wherein said first user has access to data associated with said first account in response to plugging said data storage device into said first computing device and said second user has access to data associated with said second account in response to plugging said data storage device into said second computing device.

2. The method as recited in claim 1 further comprising:
   setting up a profile to identify said first user to other users on said data storage device.

3. The method as recited in claim 1 further comprising:
   receiving control access rights to said data associated with said first account from said first user; and
   enabling said data associated with said first account to be accessed by other users according to said control access rights.

4. The method as recited in claim 3, wherein said control access rights comprise one or more of the following: creating, reading, writing and deleting permissions.

5. The method as recited in claim 1 further comprising:
   establishing access to all accounts created on said data storage device for an owner for said data storage device.

6. The method as recited in claim 1, wherein said data storage device comprises a flash memory with an integrated Universal Serial Bus (USB) interface.

7. The method as recited in claim 6, wherein said first and second computing devices are recognized based on one or more properties available on said USB interface.

8. The method as recited in claim 7, wherein said properties comprise one or more of the following: name, type and serial number.

* * * * *